United States Patent [19]

Trears

[11] Patent Number: 4,684,616
[45] Date of Patent: Aug. 4, 1987

[54] METHODS FOR THE REMOVAL AND/OR PREVENTION OF BUILD-UP OF SLAG AND COMPOSITION FOR USE IN SAID METHODS

[76] Inventor: Patrick J. Trears, 81 Roselawn Road, Castleknock, County Dublin, Ireland

[21] Appl. No.: 833,532

[22] Filed: Feb. 24, 1986

[30] Foreign Application Priority Data

Feb. 25, 1985 [IE] Ireland .................................. 465/85

[51] Int. Cl.$^4$ ............................................ C03B 40/02
[52] U.S. Cl. ....................................... 501/49; 501/52; 65/27; 65/168; 134/2; 134/11; 134/19; 134/22.16
[58] Field of Search ................. 65/27, 168; 134/2, 11, 134/19, 22.16; 501/49, 52

[56] References Cited

U.S. PATENT DOCUMENTS

| | | | |
|---|---|---|---|
| 2,652,350 | 9/1953 | Dailey | 134/2 X |
| 2,847,374 | 8/1958 | Webster et al. | 134/2 X |
| 3,376,122 | 4/1968 | Domicone | 65/27 |
| 4,074,991 | 2/1978 | Brzozowski et al. | 65/27 |

OTHER PUBLICATIONS

Soviet Inventions Illustrated, Section 1, Chemical: Feb. 1971: Derwent Publications Ltd., London.
Soviet Inventions Illustrated, Section P, Y; Week B45, Dec. 19, 1979; Derwent Publications Ltd. London; Q7 *SU-648 817 (Secondari Nonferr).*

*Primary Examiner*—Arthur Kellogg
*Attorney, Agent, or Firm*—Ladas & Parry

[57] ABSTRACT

Use of borax in the removal of and/or to prevent the build-up of slag on heat transfer surfaces in glass manufacture and allied industries. The borax may be used in association with a minor amount of a transition metal acetylacetonate. The borax is preferably applied directly onto the heat recuperator tubes.

15 Claims, 2 Drawing Figures

METHODS FOR THE REMOVAL AND/OR PREVENTION OF BUILD-UP OF SLAG AND COMPOSITION FOR USE IN SAID METHODS

BACKGROUND OF THE INVENTION

1. Field of the Invention

This invention relates to a composition for use in the removal and/or prevention of build-up of slag on heat transfer surfaces. In particular, the invention relates to a composition for use in the glass manufacturing industry for the removal of slag from the heat recovery area of the furnace caused by deposits from gases exhausting from the furnace proper.

2. Description of the Prior Art

A glass manufacturing furnace operates at a temperature in the range 1400°–1700° C. Accordingly, gases exiting from the furnace do so at very high temperatures. Heat from the gases is recovered in a heat recovery chamber or recuperator which contains a plurality of heat exchange elements, normally pipes, containing a heat absorbing fluid. Build-up of slag on recuperator pipes is a serious problem in glass manufacture and allied industries.

At present in the glass industry slag (deposits) is allowed to build-up on the heat transfer surfaces with a progressive loss of heat transfer and recovery and hence loss of energy. Eventually the build-up of slag reaches a particular level when heat transfer is no longer adequate, the furnace is shut down and the slag is removed from the heat transfer elements by scraping. The normal shut down period in a large plant is one month per year. Shut down of the furnace is an extremely expensive operation which is avoided by the glass industry unless it is essential. By allowing slag to build-up losses in heat transfer energy occur which have been estimated to be approximately 7–14%. It will be appreciated that this is very costly to the glass industry.

Accordingly, it will be appreciated that any method of removing slag from recuperator tubes during normal operation would be a significant breakthrough.

The components of the slag deposited from gases exiting from a glass making furnace are sodium sulphate, phosphor and lead.

It is an object of the present invention to provide a composition which will remove slag which has built-up on the aforementioned heat transfer surfaces and which can also be used to prevent future build-up of slag on said surfaces.

SUMMARY OF THE INVENTION

Accordingly, the invention provides a method for removing slag from heat transfer surfaces in plant used in glass manufacture and other plant where raw materials similar to those employed in glass manufacture are used, which method comprises applying to said surfaces a given quantity of borax, optionally in the presence of an inert carrier material.

The invention also provides a method for preventing the build-up of slag on heat transfer surfaces in plant used in glass manufacture and other plant where raw materials similar to those employed in glass manufacture are used, which method comprises applying either continuously or at regular intervals to said surfaces a given quantity of borax, optionally in the presence of an inert carrier material.

The invention further provides a composition for use in the removal and/or prevention of build-up of slag on heat transfer surfaces in plant used in glass manufacture and other plant where raw materials similar to those employed in glass manufacture are used, which composition comprises borax in association with a carrier or diluent therefor.

DESCRIPTION OF THE PREFERRED EMBODIMENTS

Preferably, the composition includes a minor proportion of a transition metal acetylacetonate, wherein the transition metal is selected from iron, chromium, zinc, aluminium and cobalt. The preferred compound is ferric acetylacetonate.

The composition may contain up to 100 parts of borax per one part of transition metal acetylacetonate. However, preferably, the borax and the transition metal acetylacetonate are present in the ratio 50:1.

Borax is natural hydrated sodium borate having the formula $Na_2B_4O_7.10H_2O$.

The borax may be in the form of granules or powder.

The compositions according to the invention may be in the form of a solid or a liquid.

The solid compositions which contain ingredients other than borax are formed by admixture of the solid ingredients. In the case of liquid compositions the compositions are formed by adding the solid ingredients to a suitable diluent. The preferred diluent is water.

The solid compositions according to the invention may be compacted using conventional compacting procedures so as to form a unit which can be readily handled.

The composition according to the invention can be added to exhaust gases on leaving the glass furnace and before they enter the heat recovery area. Alternatively, the composition may be applied to surfaces where deposits have already built-up, such as directly onto the heat exchange elements of the heat recuperator.

When the furnace is in use the compositions are either injected or blown into the area where it is desired to treat slag. For example, when applied to an area between the furnace and the heat recovery area, the composition vapourises and then combines and interacts with the exhaust gases.

If it is desired to prevent the build-up of slag in a glass making furnace, the composition according to the invention can be applied continuously. For example, a metered amount of the composition may be injected or blown into the stream of exhaust gases at a point intermediate the furnace and the heat recovery area at regular intervals. A typical glass making plant when operating at maximum output produces 7 to 8 tons of exhaust gases per hour.

When it is desired to de-slag a glass furnace, which has not previously been treated with the composition according to the invention, it may either be necessary to shut down the furnace or, alternatively, where the glass making plant includes more than one heat recovery chamber, to close off the heat recovery chambers in turn by directing the flow of gases to the remaining heat recovery chambers. Normally, an average size glass making plant will include two heat recovery chambers. When applying the composition according to the invention to the heat exchange elements of the heat recovery chamber these will normally be at a high temperature. The heat exchange elements retain heat for a considerable period of time after shut-down of the heat recovery chamber. The composition according to the invention operates more successfully at high temperatures. The composition according to the invention is sprayed or blown onto the heat exchange element or elements from which it is desired to remove slag. When it is desired to introduce the composition directly into the heat recovery chamber, the composition will be introduced through a port hole normally located in the wall of said heat recovery chamber. However, it is important that the heat exchange elements remain at a high temperature during the de-slagging process. Accordingly, it is desirable to prevent heat loss from the chamber during the introduction of the composition according to the invention. Preferably, the composition is introduced into the chamber under pressure.

According to a preferred embodiment of the invention the composition is introduced into the heat recovery chamber through an insulated tube. Suitably, the tube is provided with a water-cooled jacket which prevents sticking or clogging of the composition if the composition is in the form of a powder. Furthermore, a source of compressed air is preferably used for injecting the composition into the heat recovery chamber.

As stated above the compositions according to the invention also have application in other industries which use raw materials such as sand and silica which are used in the glass making industry. One such industry is the cement making industry, where the compositions according to the invention can be successfully applied to and de-slag the cement making kilns. As will be appreciated the invention also has application in the pottery-making industry.

DESCRIPTION OF THE DRAWINGS

The invention will be further illustrated with reference to the accompanying drawings in which:

Referring to FIG. 1 of the drawings there is indicated generally at 1 a portion of a glass making plant for making glass bottles and the like containers and consisting of a furnace 2 and a heat recovery chamber 3. The necessary raw ingredients for making the glass are introduced through inlet 4. The furnace proper, in use, contains the ingredients in molten state 5 and is heated to a temperature in the range 1400°–1700° C. by a plurality of burners 6 disposed in a pair of opposed walls defining two sides of said furnace 2. The molten glass leaves the furnace through outlet 7.

Vapours and combustion gases collect above the molten liquid 5 and exit through a pair of outlets 8a and 8b and are conveyed to the heat recovery chamber by a conduit 9.

Figure 2:
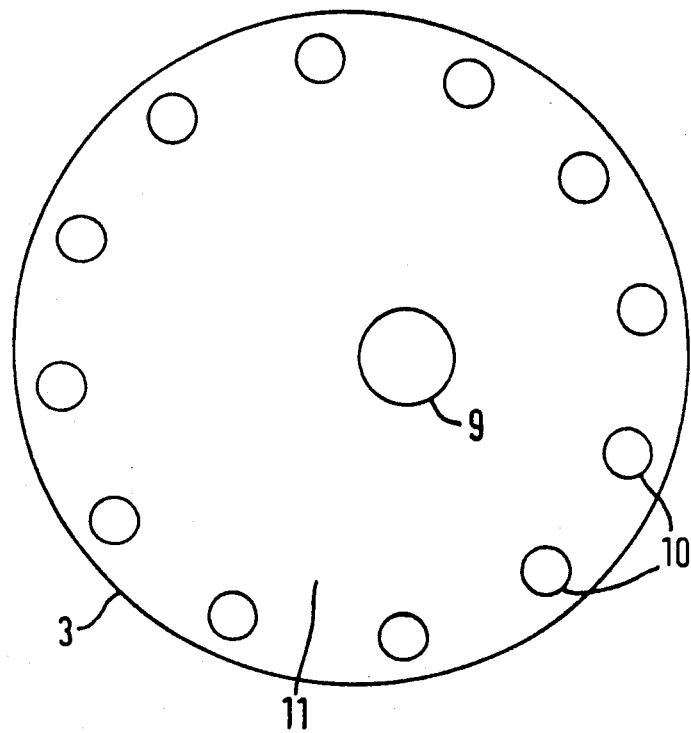
FIG. 2 is a schematic representation in plan of the glass making furnace and associated heat recovery chamber depicted in FIG. 1.

The heat recovery chamber 3 which is in the form of a cylindrical tower has a plurality of heat exchange tubes 10 disposed regularly about the periphery of said chamber (see FIG. 2). The gases travel through a passage 11 internally of the heat exchange tubes 10 and exhaust into a main flue 12 by way of an outlet 13. The exhaust gases include vapours and a certain amount of molten material. During their passage through the chamber 3, molten materials and vapours condense on the walls of the tubes 10. The material deposited by the gases and remaining on the tubes 10 is termed slag. As slag builds up on the tubes 10, heat transfer becomes progressively less efficient resulting in loss of heat to the atmosphere through the main flue 12.

The gases entering the heat recovery chamber 3 are generally at a temperature in excess of 1400° C. It has been found that the inner surfaces of the tubes 10 which come in contact with the gases have a temperature of approximately 1400° C., whereas, the surfaces of the tubes nearer the periphery of the chamber 3 have a temperature in the region of 800° C. It is found that slag builds up selectively on the walls of the tubes nearest the periphery of the chamber 3. The melting point of the slag has been found to be in the region of 870°.

However, there is also some build-up of slag on the walls of the tubes in contact with the hot gases because when the furnace is initially started up the tubes are cold and the slag deposits on the cold surfaces of said tubes.

The composition according to the invention can be applied when the furnace is in operation by injecting or blowing the composition into the conduit 9, whereupon the composition combines with the gases and is exhausted to the heat recovery chamber 3 as hereinabove described. Alternatively, the composition can be injected directly into the chamber 3 as hereinabove described.

When the furnace is not in operation the composition according to the invention can be sprayed onto the heat exchange tubes 10 or onto other surfaces of the furnace, for example, the internal walls of the furnace proper 2.

As indicated above the glass making plant will generally include two heat recovery chambers. Accordingly, one of the chambers may be shut down by diverting the gas flow to the second chamber so as to carry out de-slagging of one of the chambers in the manner as hereinabove described.

Figure 1:
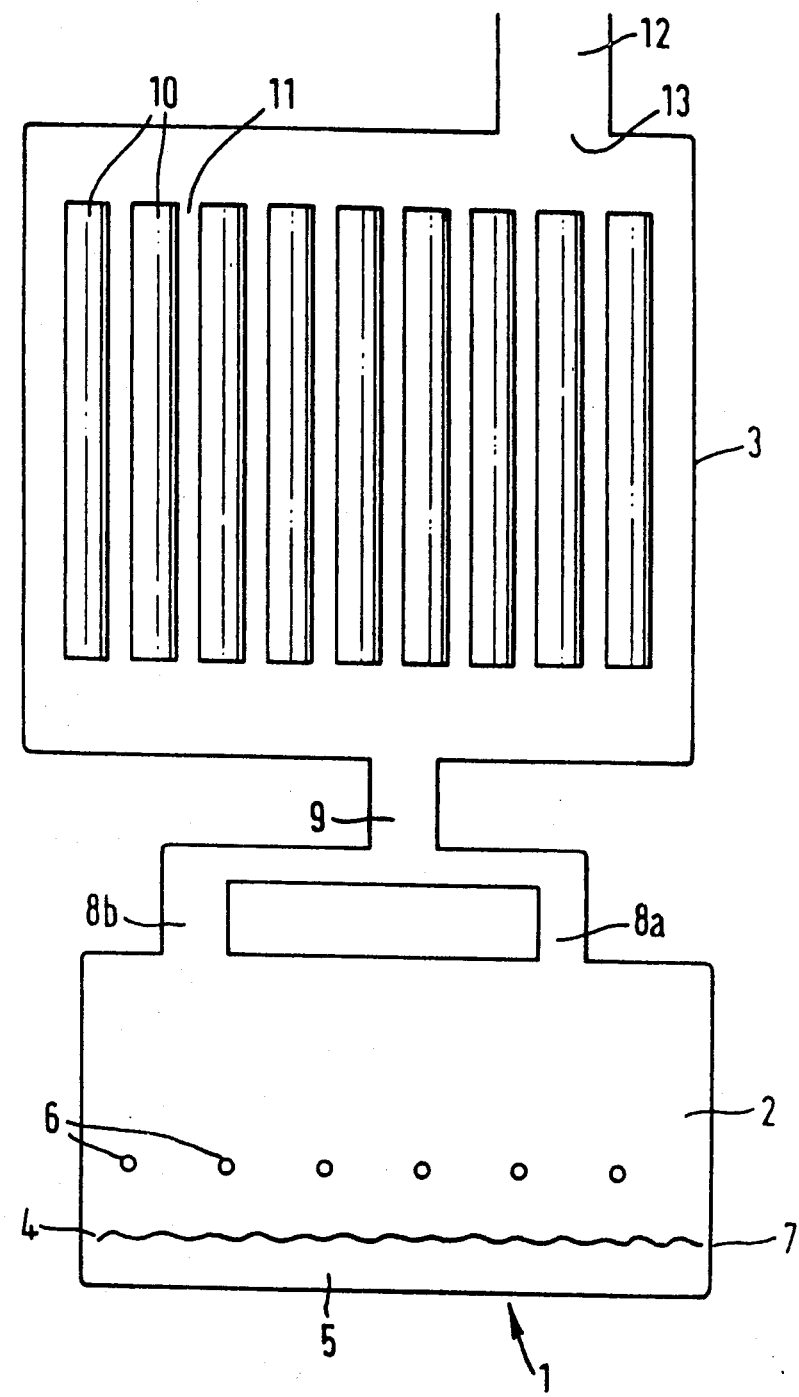
FIG. 1 is a schematic representation in section of a glass making furnace and associated heat recovery chamber of a conventional glass making plant.

In experimental trials carried out at a glass making plant in Dublin, one of the two heat recovery chambers was closed down and 2 kg of a composition comprising borax and ferric acetylacetonate in the ratio of 50:1 was introduced under pressure using a compressed air pipe into the heat recovery chamber through one of three port holes located in the peripheral wall of the heat recovery chamber. The composition was introduced through an insulated tube as hereinabove described. The composition was applied to a selected one of the heat exchange tubes. In less than 90 seconds 1 kg of slag was collected through a door in a conduit corresponding to conduit 9 of FIG. 1.

When the composition was applied to the hot surface of the tube the slag was observed to bubble on the tube and then simply fell off.

The type of borax used in the experimental trials was industrial grade borax as supplied by Lennox Chemicals, Dublin.

The normal build-up of slag at the plant where the trials were conducted is 5 tons per year. Normally, the plant is shut down once a year so as to remove the slag. The normal cleaning procedure used involves sand blasting the recuperator tubes when cold during a furnace repair, when the recuperator is readily accessible. While 100% cleaning is possible by this method, the tubes remain relatively clean for only about 12 months from the start of a new cycle of operation and for the remaining four to five years the combustion air temperature gradually drops to about 550° C. Therefore, this loss in combustion air temperature results in an increase in fuel consumption of 5 to 7% for about 75% of the complete use cycle. The cost of such slag removal amounts to IR 500,000 to the Company. It is estimated that using two and a half tons of composition according to the invention, at a cost of less than IR 2000, would be sufficient to maintain the heat recovery chambers free of slag. Accordingly, the advantages to the industry are considerable and immediately apparent.

The initial aim of the invention was to lower the melting point of the slag so as to prevent build-up thereof on the heat exchange elements. Slag has a melting point in the region of 870° C. As stated above the "cold" or outer walls of the heat exchange elements in operation have a temperature in the region of 800° C. It was postulated that if the melting point of the slag could be lowered to a temperature below 800° C. no deposition of slag would occur.

In the trials carried out not only did the composition according to the invention lower the melting point of the slag but it also caused the removal of the slag as described above.

In the trails carried out the original surface of the tube became visible for the first time since installation.

A series of tests were also carried out in the laboratory on a fouled (outer surfaces) recuperator pipe section supplied by Irish Glass Bottle Company Limited, Dublin. A number of experiments were carried out where borax powder was deposited on the fouled outer surface of the recuperator tube at elevated temperatures, to determine if the application of the borax powder to the test section of pipe under simulated furnace conditions would result in slag breakdown.

The test section was cut into eight smaller sections of length approximately 3.5 inches and diameter 2.5 (i.d.). Each of these sections was heat treated separately as outlined below.

PROCEDURE

Seven of the eight sections were heated to different temperatures between 500° C. and 800° C. in a Gallenkamp Muffle Type (Trade Mark) furnace. The powder was deposited over the upper portion of the tubes by opening the furnace door quickly at the set temperature and physically depositing 60 g. of the powder on the tube sections.

One of the test sections was heated to 700° C. and allowed to cool in air. This was to check if the process of heating and cooling was in itself sufficient to break up and remove the slag.

RESULTS

| Section No. | Temperature (°C.) | Observation |
|---|---|---|
| 1 | 700 | No powder added. Removed from furnace. Air cooled. Slag intact. |
| 2 | 500 | Powder added. Immediate puffing. Partial slag removal. |
| 3 | 550 | As above |
| 4 | 600 | As above |
| 5 | 650 | As above |
| 6 | 700 | As above |
| 7 | 750 | As above |
| 8 | 800 | As above |

CONCLUSIONS

The limited series of tests carried out demonstrated that the application of the borax powder to the surface of fouled recuperator tubes at elevated temperatures resulted in the breakdown of slag. There is no reason to believe that the slag composition in the Irish Glass Bottle Company Limited differs greatly from that in the industry as a whole. Accordingly, it may be concluded that the application of the composition according to the invention as a means of removing slag from recuperator tubes could prove to be of major commercial significance.

Although not wishing to be bound by any theoretical explanation of the invention, it is postulated that the composition according to the invention causes a breakdown of the molecular structure of the slag when applied to a surface covered by slag. Similarly, the function of the composition according to the invention in preventing the formation of slag is considered to be due to the composition inhibiting a sequence of reactions leading to the formation of slag, in addition to lowering the melting point of the slag as stated above.

I claim:

1. A composition for use in the removal and/or prevention of build-up of slag on heat transfer surfaces in plant used in glass manufacture and other plant where raw materials similar to those employed in glass manufacture are used, which composition comprises borax in association with a carrier or diluent therefor and a minor proportion of a transition metal acetylacetonate.

2. A composition according to claim 1, wherein the transition metal of the transition metal acetylacetonate is selected from the group consisting of iron, chromium, zinc, aluminum and cobalt.

3. A composition according to claim 2, which includes a minor proportion of ferric acetylacetonate.

4. A composition according to claim 1, wherein the borax and the transition metal acetylacetonate are present in a ratio of 20:1 to 100:1 parts by weight.

5. A composition according to claim 4, wherein the borax and the transition metal acetylacetonate are present in a ratio of 50:1 parts by weight.

6. A composition according to claim 3, wherein the borax and the ferric acetylacetonate are present in a ratio of 50:1 parts by weight.

7. A composition according to claim 1, which is in the form of granules or a powder.

8. A method for removing slag from heat transfer surfaces in plant used in glass manufacture and other plant where raw materials similar to those employed in glass manufacture are used, which method comprises applying to said surfaces a given quantity of borax together with a minor proportion of a transition metal acetylacetonate.

9. A method according to claim 8, wherein said transition metal of the transition metal acetylacetonate is selected from the group consisting of iron, chromium, zinc, aluminum and cobalt.

10. A method for preventing the build-up of slag on heat transfer surfaces in plant used in glass manufacture and other plant where raw materials similar to those employed in glass manufacture are used, which method comprises applying either continuously or at regular intervals to said surfaces a given quantity of borax together with a minor proportion of a transition metal acetylacetonate.

11. A method according to claim, 10 wherein said transition metal acetylacetonate is ferric acetylacetonate.

12. A method according to claim 8, wherein said material being applied is added to exhaust gases on leaving the glass furnace and before they enter the heat recovery area.

13. A method according to claim 10, wherein said material being applied is added to exhaust gases on leaving the glass furnace and before they enter the heat recovery area.

14. A method for removing slag from heat transfer surfaces in plant used in glass manufacture and other plant where raw materials similar to those employed in glass manufacture are used, which method comprises applying directly onto the heat exchange elements of the heat recuperator borax in association with a carrier or diluent therefor and a minor proportion of a transition metal acetylacetonate.

15. A method for preventing the build-up of slag on heat transfer surfaces in plant used in glass manufacture and other plant where raw materials similar to those employed in glass manufacture are used, which method comprises applying, either continuously or at regular intervals, onto the heat exchange elements of the heat recuperator borax in association with a carrier or diluent therefor and a minor proportions of a transition metal acetylacetonate.

* * * * *